H. B. KRAUT.
FRAME FOR METAL CUTTING MACHINES.
APPLICATION FILED MAR. 4, 1919.
1,389,879.
Patented Sept. 6, 1921.
6 SHEETS—SHEET 5.
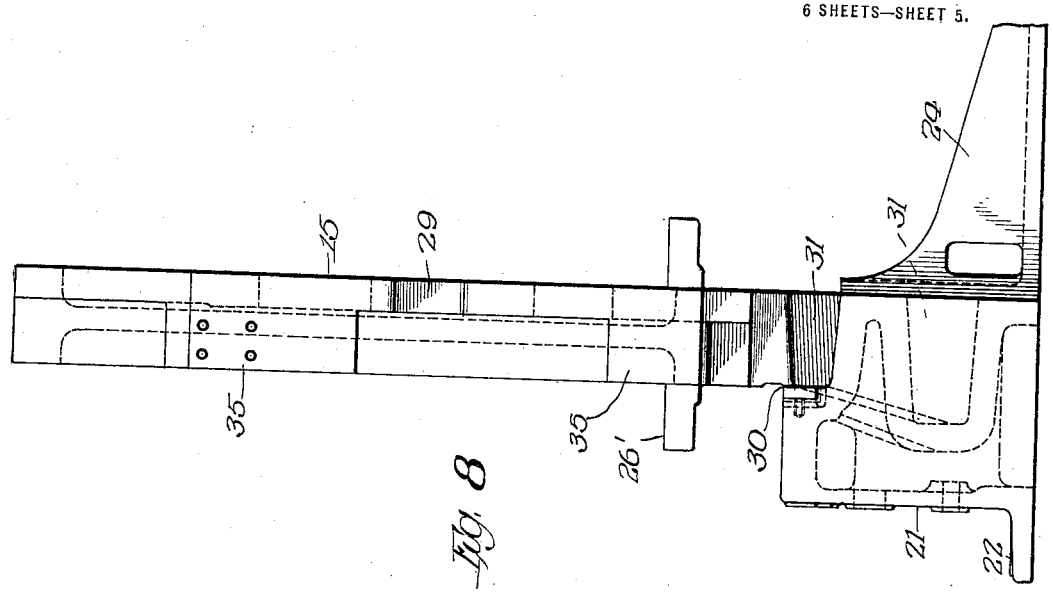
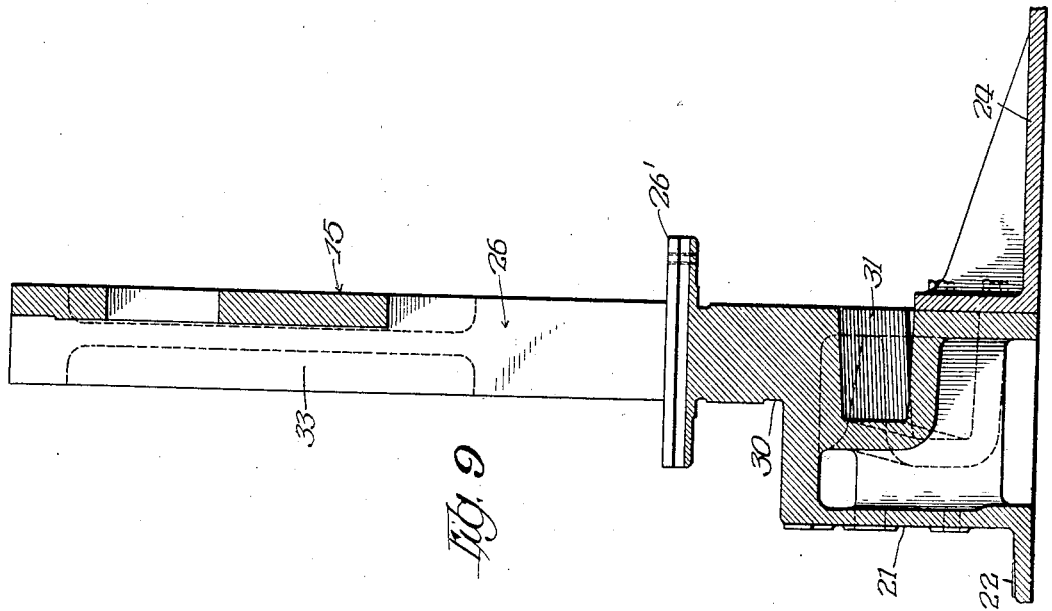

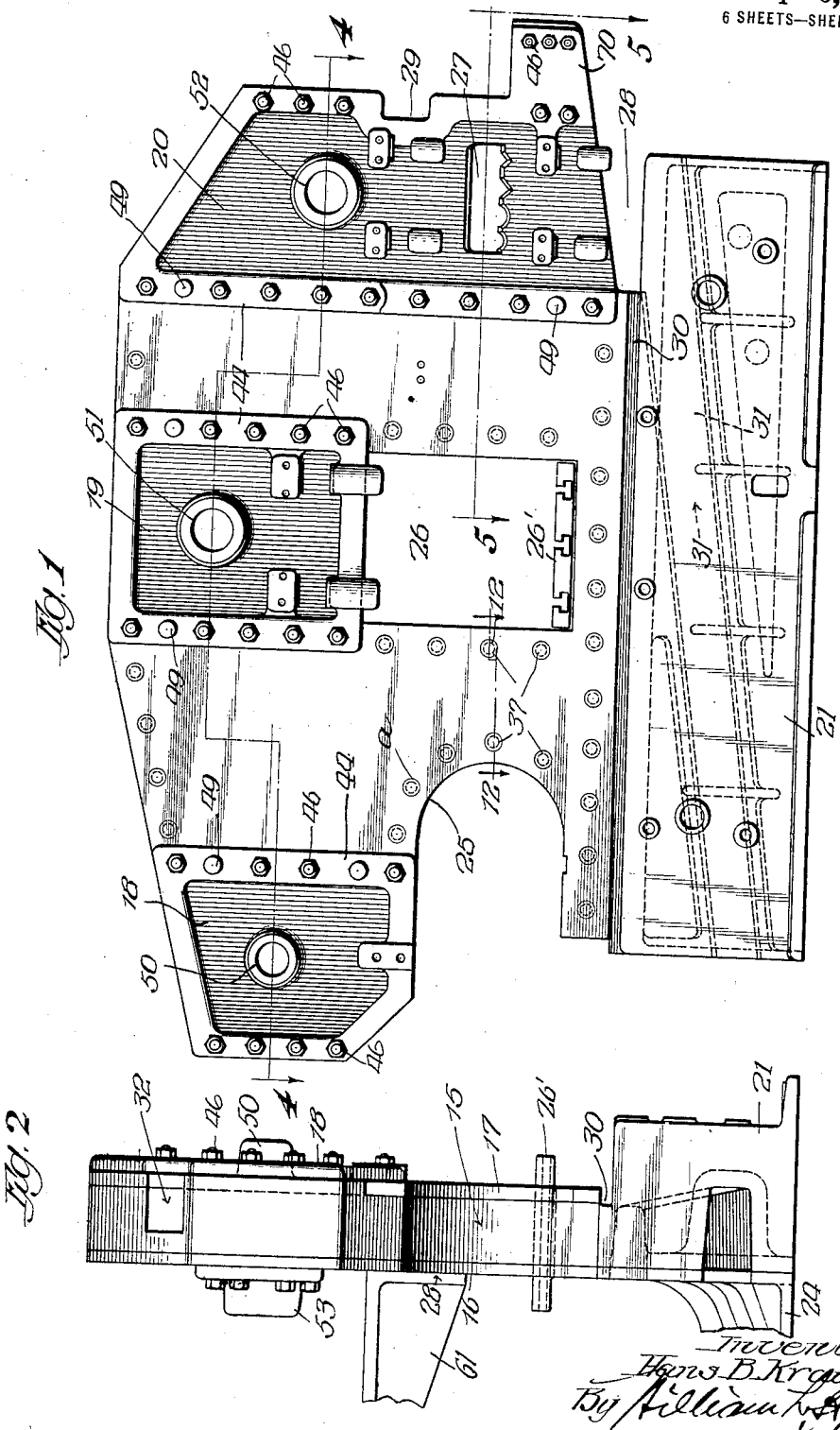

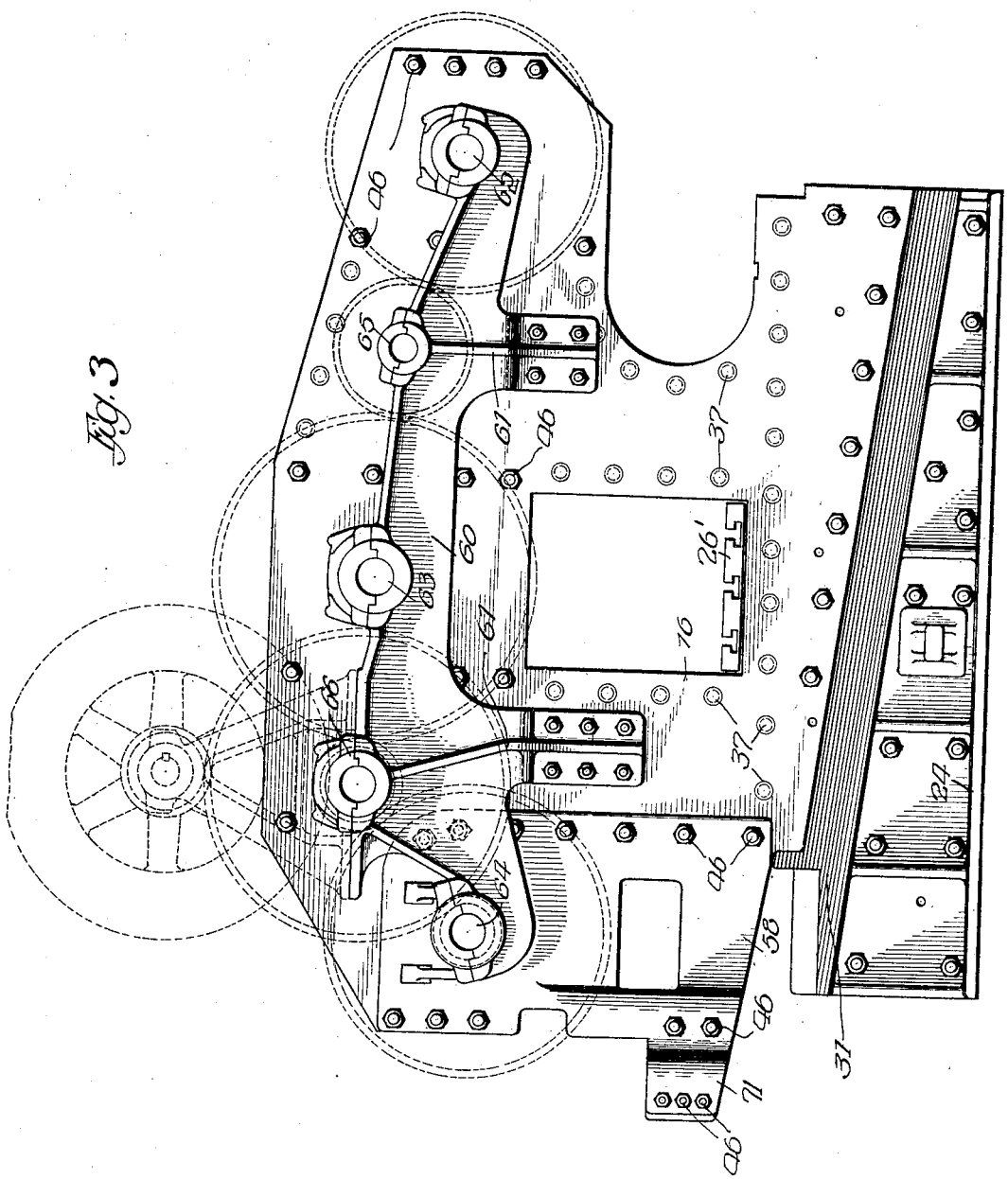

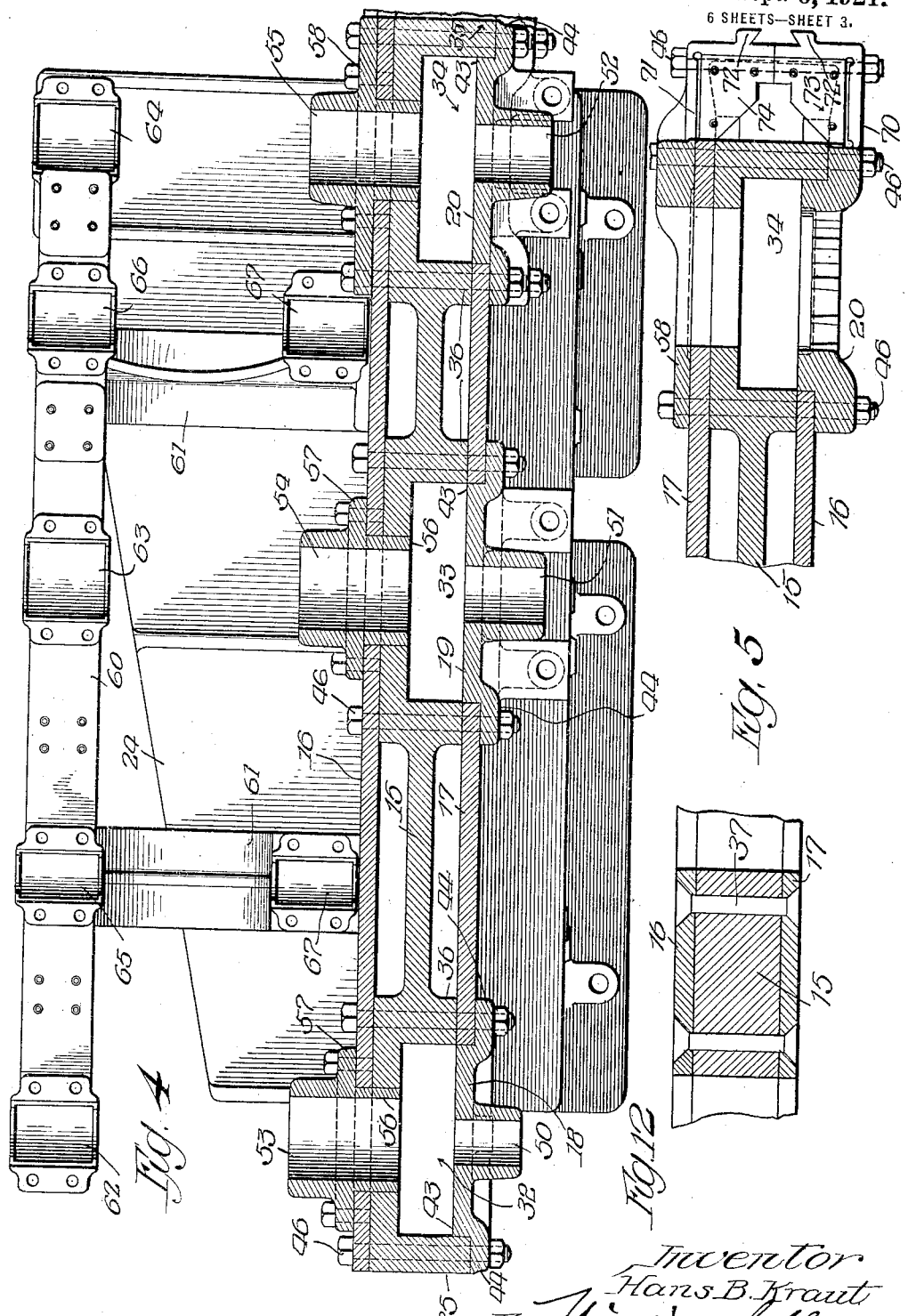

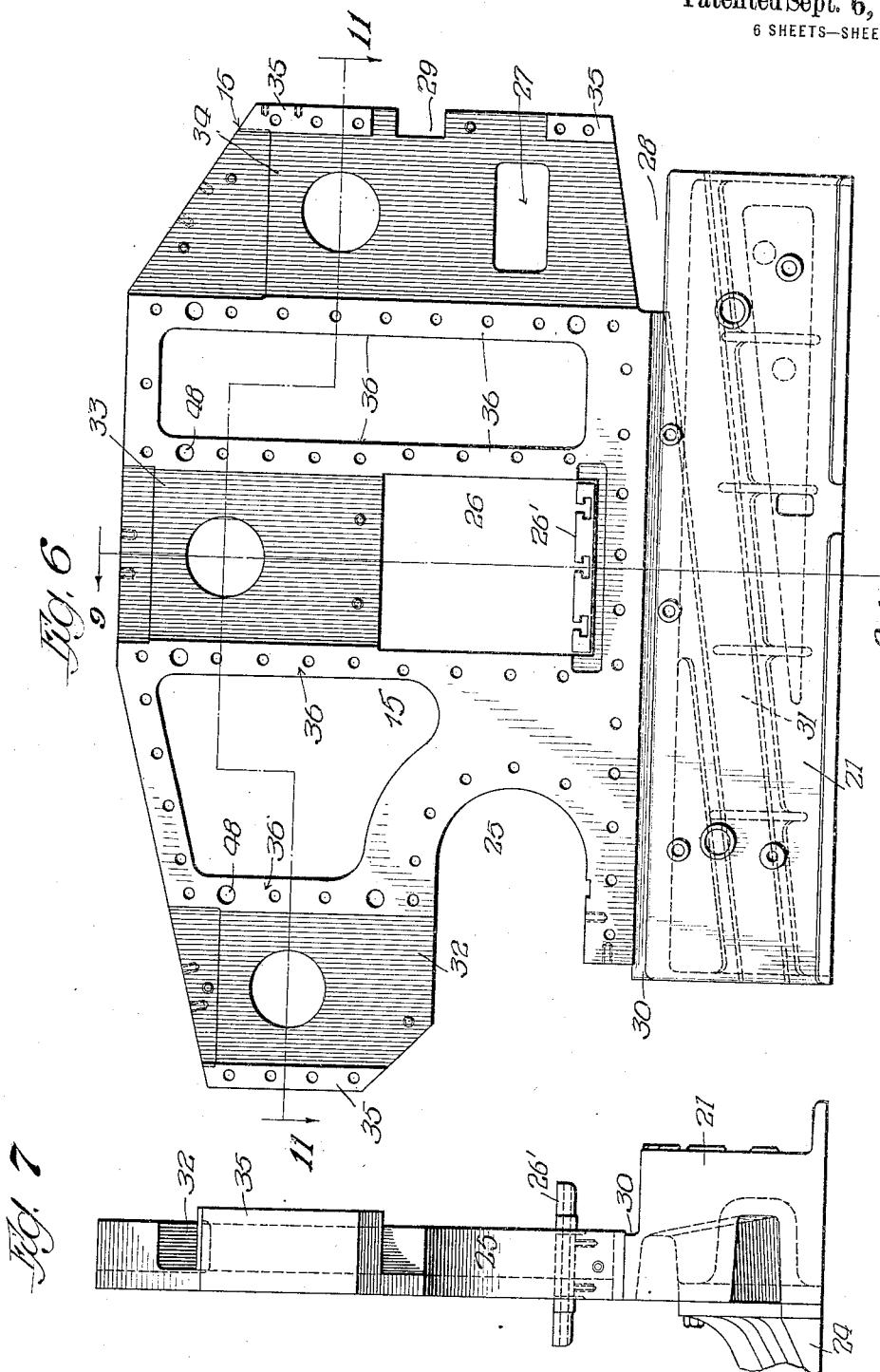

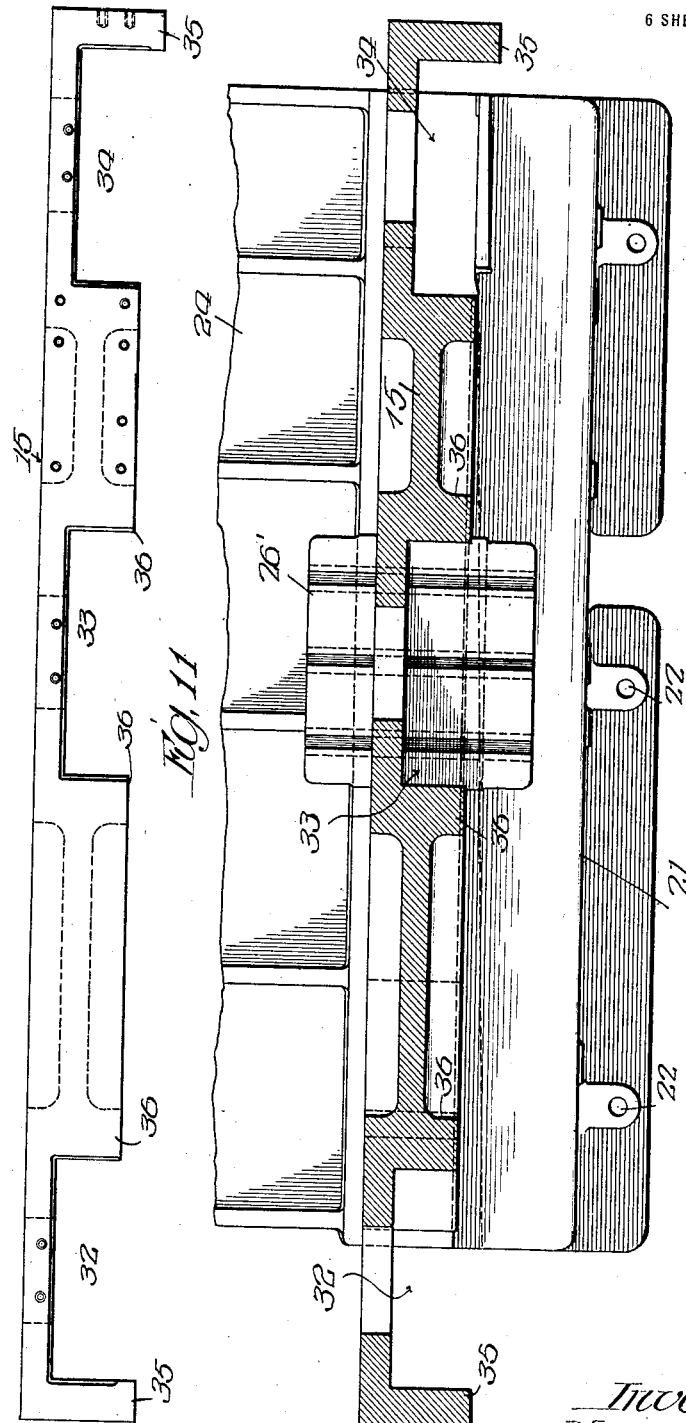

UNITED STATES PATENT OFFICE.

HANS B. KRAUT, OF CHICAGO, ILLINOIS.

FRAME FOR METAL-CUTTING MACHINES.

1,389,879. Specification of Letters Patent. Patented Sept. 6, 1921.

Application filed March 4, 1919. Serial No. 280,613.

*To all whom it may concern:*

Be it known that I, HANS B. KRAUT, a citizen of the United States, and a resident of Chicago, in the county of Cook and State of Illinois, have invented certain new and useful Improvements in Frames for Metal-Cutting Machines; and I do hereby declare that the following is a full, clear, and exact description thereof, reference being had to the accompanying drawings, and to the characters of reference marked thereon, which form a part of this specification.

This invention relates to improvements in frames for metal working machines, such as punching, shearing, bar cutting, section cutting and coping and notching machines, and is herein shown as applied to a frame for a combined punching, shearing, section cutting, bar cutting and coping or notching machine, such as is shown in my companion application for United States Letters Patent filed on the 4th day of March, 1919, Serial Number 280,615. Certain features of the invention, however, are adaptable to frames of machines having operative elements of a less number than that herein shown.

Among the objects of the invention is to produce a machine frame for this purpose which is so constructed as to be exceedingly rigid as compared to its weight, and economical to produce relatively to its efficiency, and a construction which is particularly adaptable to combination machines which are built to operate on large work, and, therefore, to withstand great operating stresses.

In respect of this phase of the invention, the frame comprises an intermediate skeleton integral structure, made of cast metal, which extends from end to end of the frame and is ribbed or flanged at certain portions thereof for the double purpose of lightening parts of the frame intermediate those parts subject to localized operating stresses, and also to provide oppositely faced bearings to receive rolled plates which are applied to the opposite side of the cast metal skeleton structure and are pin riveted thereto to produce a composite frame structure, said flanges or ribs also being arranged to produce ways or guides for the various tool operating slides of the machine.

Another object of the invention is to produce a machine frame of this character that is provided with ways or guides for tool operating slides, so constructed and arranged as to permit the slides to be readily removed from and applied to the frame by the removal of simple parts and without the necessity of dismantling the frame structure.

In respect of this phase of the invention, the frame embraces the use of what may be termed cover plates that are fitted to the frame opposite said guides and in a manner to constitute one wall thereof, and are bolted or otherwise detachably secured to the frame so as to be removed laterally therefrom, the side boundaries of said ways or guides being formed at one side of the frame by said plates and at the other side thereof by the intermediate metal skeleton structure.

Another object of the invention is to produce in a frame of this character bearings for operating shafts of the tool operating slides, which bearings are formed on or associated with the side plates and said cover plates in such a way that the operating stresses of said shafts are transmitted through said bearings to both the side plates and the intermediate cast structure of the frame in the direction of their planes.

A further object of the invention is to produce a frame of the character which embodies a notching and coping bolster constructed in a way to produce an exceedingly rigid structure, the support of which is so incorporated in the frame as to carry the operating stresses well back into the frame from the coping end thereof and to uniformly distribute them to the frame in the planes of the side and intermediate members thereof.

Other objects of the invention are to improve and simplify composite frames for metal working machines, and the invention consists in the combination and arrangement of the parts shown in the drawings and described in the specification, and is pointed out in the appended claims.

In said drawings;

Figure 1 is a side elevation of a composite frame embodying my invention.

Fig. 2 is an end elevation thereof looking toward the punch end of the frame.

Fig. 3 is an opposite side elevation of the frame.

Figs. 4 and 5 are horizontal sections on the respective lines 4—4 and 5—5 of Fig. 1.

Fig. 6 is a side elevation of the skeleton intermediate member of the frame.

Fig. 7 is an end elevation thereof looking toward the punch end of the frame.

Fig. 8 is an end elevation thereof looking toward the opposite end of the frame.

Fig. 9 is a section on the line 9—9 of Fig. 6.

Fig. 10 is a top view of the skeleton intermediate frame.

Fig. 11 is a horizontal section on the indirect line 11—11 of Fig. 6.

Fig. 12 is a section on line 12—12 of Fig. 1.

The frame of the machine comprises as its essential elements an intermediate cast metal skeleton structure 15, side plates 16, 17, and cover plates 18, 19, 20.

The skeleton intermediate frame embraces a supporting or base portion 21 which may be fastened to the floor by bolts extending through openings 22 of the base. The base embodies additionally a laterally extending ribbed foot portion 24 shown as made separate from and bolted or otherwise secured to the base and wider at one end than at the other so as to give proper stability to the frame. The skeleton intermediate frame is shaped at one end of the frame to provide a throat 25, at which end of the frame is adapted to be supported the operative elements of the metal punch, as shown in my aforesaid companion application. Intermediate the ends of the skeleton frame is formed an opening 26 to receive the operative elements of a section cutting mechanism also shown in the aforesaid application, and at the bottom of said opening are formed flanges 26′ extending on opposite sides of the plane of the intermediate member to support the fixed blades of the section cutting mechanism. At the end of the frame remote from the throat 25 it is formed with an opening 27 which in the complete machine is located in line with a bar cutter. The latter end of the frame is shaped to provide a notch 28, at which are located in the complete machine the operative elements of a shearing mechanism. At said latter end of the frame above the bar cutter opening 27 the skeleton structure is formed with a notch 29 to receive parts of a coping and notching tool holder. The base 21 of the frame is formed to provide at opposite sides work guides 30, 31 which extend from the shearing notch 28 throughout the length of the base, the guide 31 being inclined downwardly to receive and guide the strip cut from a plate and the guide 30 being adapted to direct the stock or body of the plate.

The skeleton frame is provided at the punch end, at the intermediate section cutter portion and at the shearing, bar cutter, and coping and notching end with vertical recessed portions or depressions 32, 33, 34 which are bound or defined at their edges by flanges or ribs 35 and 36, the end flanges or ribs 35 being made somewhat deeper than the intermediate flanges or ribs 36.

The side plate 17 is shaped or cut away at the throat 25 and opening 26 to conform to the said openings formed in the skeleton casting, and terminate at the inner or proximate edges of the ways 32 and 34, as best shown in Figs. 1 and 4. The plate 16 at the opposite side of the frame extends from end to end of the frame, as shown in Figs. 3 and 4 and from the top of the frame to the guides 31, and is formed with openings and notches to, respectively, register with the throat 25 and the openings 26 and 27 and the notches 28 and 29.

The said skeleton intermediate member and the side plates are fixed rigidly together by means of said plates and skeleton frame, as most clearly shown in Fig. 12. The openings in said plates are enlarged or counter bored at the outer faces of the plates and the pins are formed at one end with tapered heads to fit the counter-bored openings in the plate at one side of the frame. Said pins are cold driven into said openings and are heated and upset or riveted at their plane ends into the counter-bored openings at the other side of the frame. Thereafter the faces of the plates are subjected to a planing operation to finish the pin ends flush with the faces of the plates. In this manner the pins fit tightly in said openings and transmit shearing stress from one frame member to the other without movement of the frame members relatively to each other.

Applied over the way or guides 32, 33, 34 at one side of the frame are the cover plates 18, 19, 20, respectively. Said plates are formed with inner squared insets or extensions 43 (Fig. 4) which form shoulders that snugly fit within said guides or ways and are provided with external flanges 44 that fit on the outer faces of the ribs 35 at the ends of the frame and on the marginal portion of the sides of said guides. The said cover plates are shown as rigidly connected to the intermediate skeleton member and the plates 16 and 17 by bolts 46 that extend through the several frame members. The said intermediate skeleton member is provided at suitable points with openings 48 to receive holding or centering pins 49 to hold the cover plates in place while being bolted on the frame, and also while the bolts are being removed to remove said cover plates.

The cover plates are provided with integral tubular bearings 50, 51, 52 to receive and support the operating shafts for slides that operate in the guides or ways 32, 33, 34, respectively. In line with said bearings 50, 51 are other flanged bearings 53, 54, the inner tubular portions 56 of which extend through and fit tight in registering openings in the adjacent plate 16 and the skeleton member, the flanges 57 of said bearings 53, 54, fitting on the outer face of said plate 16 and being attached thereto by tap bolts or other suitable fastening means. A third bearing 55 is arranged in line with the bearing 52 at the shearing, and notching and coping end of the machine and is seated in openings in the frame members 15 and 16. The said bearing 55 is integral with a large flange having the form of a plate 58 that is bolted to the frame by the bolts 46, and constitutes part of a support for a coping and notching device bolster, as will hereinafter more fully appear.

The inset or shouldered portions 43 of the cover plates which interlock with the frame members at open sides of the guides or ways, in connection with the fastening bolts 46, which extend entirely through the frame, form a rigid interlocking connection between the cover plates and the frame, and the extension of the flanged bearings 53, 54, 55 through the plate 16 and the intermediate skeleton frame forms a rigid interlocking connection of said bearings with the frame. Therefore, the bearings for operating shafts are very rigidly supported in said frame against deflection from alinement and in a manner to efficiently transmit the operating stress of the shafts through said bearings uniformly to the members of the frame and in directions parallel to their planes.

Located at the side of the frame opposite to said cover plates is an elongated bearing bracket 60 that extends from end to end of the frame and is supported from the frame by ribbed arms 61. Said bracket is provided in line with the flanged bearings 53, 54, 55 with extension bearings 62, 63, 64, respectively, to receive the outer ends of tool slide operating shafts, and with intermediate bearings 65, 66 that are alined with other bearings 67 supported at the inner ends of the arms 61 to receive shafts that support intermediate gears that mesh with the driving gears of the main operating shafts, in the manner shown in my aforesaid companion application, and as indicated in dotted lines in Fig. 3.

By reason of the removability of the cover plates 18, 19, 20 and of the fact that the bearings 50, 51, 52 for the operating shafts form part thereof, and of the fact that the bearing brackets for the operating gearing of the machine are located on the side thereof remote from the cover plates, the tool slides which operate in said guides or ways 32, 33, 34 may be readily removed and without clashing with gears or bearings by removing the nuts of the bolts 46 and detaching the said cover plates.

At the bar cutting and shearing end of the frame said frame is constructed to form a support for a coping and notching bolster that supports the fixed coping and notching blade. In accordance with one phase of my invention, the support for the coping and notching bolster is formed at one side by an extension 70 of the cover plate 20 at one side of the machine and an extension 71 of the plate 58 which carries the bearing 55 at the other side of the frame. The lower portions of the cover plate and plate 58 are laterally thickened to give proper support to the coping and notching bolster extensions 70, 71. The coping and notching bolster, as herein shown, comprises two members 73, 74, each made integral with one of the extensions 70, 71, the said extension and the bolster members meeting in the median plane of the frame and being clamped together by the bolts 46. The said extensions 70, 71 are provided with under-cut lugs 72 which form, when assembled, a groove to receive a support for a gage screw to hold the work on the bolster, as shown in my aforesaid companion application. The flanges 35 at the coping and notching end of the intermediate frame member 15 are interrupted (Fig. 6) to afford space for movement of the movable coping or notching tool holder.

The overlapping arrangement of the cover plate 20 and the plate 58 for a substantial distance rearwardly on the frame, and the rigid attachment of said plates to the frame has the effect to enormously strengthen the connection of the coping and notching bolster support to the frame and prevent operative stresses on this overhanging portion of the frame from bending the support out of alinement with the movable blade on the bolster. Moreover, by reason of the fact that the alined bearings 52, 55 are formed on and supported by the plates 20 and 58, respectively, operating stresses on the support in direction of the planes of the plates 20 and 58 are partially sustained by the shaft mounted in said bearings and which shaft operates the tool slide which carries the shear, bar cutter, and coping and notching blades in the manner shown in my aforesaid companion application.

I claim as my invention:

1. A machine frame comprising an intermediate cast metal member flanged to provide ways that open at one side thereof, plates attached to said intermediate member, the plate on the side of the member toward which the ways open being interrupted at said ways, and removable cover plates over said ways.

2. A machine frame comprising an intermediate cast metal member flanged to provide ways that open at one side thereof, the edges of said flanges being faced, plates fitted to said faced flanges and pins cold driven into registering openings of said frame member and plates, the openings in the plates being countersunk and the pin ends being upset therein, the surfaces of said plates and the rivet ends being planed.

3. A machine frame comprising an intermediate cast metal member flanged to provide ways that open at one side thereof, plates attached to the opposite sides of said intermediate member, the plate on the side of the intermediate member toward which the ways open being interrupted at said ways, and cover plates applied over the open sides of said ways and interlocked to the frame member and bolted thereto.

4. A machine frame comprising an intermediate cast metal member flanged to provide ways that open at one side thereof, plates attached to the opposite sides of said intermediate member, the plate on the side of the intermediate member toward which the ways open being interrupted at said ways, cover plates applied over the open sides of said ways and shouldered to inset therein and provided exterior to the shoulders with flanges that overlie the latter plates and the flanges of said intermediate member, and bolts extending through said intermediate and side plates and the flanges of the cover plates to rigidly fasten them together.

5. A machine frame comprising an intermediate cast metal member flanged to provide ways that open at one side thereof, plates attached to the opposite sides of said intermediate member, the plate on the side of the intermediate member toward which the ways open being interrupted at said ways, cover plates applied over the open sides of said ways and interlocked to the frame member and bolted thereto, slide operating shaft bearings integral with said cover plates, and other bearings alined with the cover plate bearings and rigid with the frame.

6. A machine frame comprising an intermediate cast metal member flanged to provide ways that open at one side thereof, plates on the opposite sides of and attached to said intermediate member, the plate at the side of the member toward which the ways open being interrupted at said ways, cover plates removably attached to the latter plate and to said intermediate frame member to constitute the sides of said ways, said cover plates being formed with integral operating shaft bearings, and bearings alined with the cover plate bearings and attached to the frame on the side thereof opposite said cover plates.

7. A machine frame comprising an intermediate cast metal member flanged to provide ways that open at one side thereof, plates on the opposite sides of and fixedly attached to said intermediate member, the plate at the side of the member toward which the ways open being interrupted at said ways, cover plates removably attached to the latter plate and to said intermediate frame member to constitute the sides of said ways, said cover plates being shouldered and inset into said ways and being formed with integral tubular bearings, and tubular bearing members extending through the side plate opposite said cover plates and through the intermediate frame member in alinement with said cover plate bearings and provided with flanges that overlie and are secured rigidly to the adjacent side plate of the frame.

8. A machine frame comprising an intermediate cast metal member flanged to provide ways that open at one side thereof, plates fitted to opposite sides of said flanged member, pins extending through openings in said plates and intermediate member, the pin openings in the plates being countersunk and the pin ends being upset in said countersunk openings and finished flush with the lateral faces of the plates, the plate at the side of the frame toward which the ways open being interrupted at said ways, cover plates fitting over and interlocked to said lateral openings and attached to the frame, and bearings for operating shafts carried by said cover plates and alined with other bearings carried by the opposite side of the frame.

9. A machine frame comprising an intermediate cast metal member flanged to provide ways that open at one side of the intermediate member, plates pinned to the opposite sides of said flanged intermediate member, the plate at the side of the frame toward which the ways open being interrupted at said ways, cover plates fitted over said lateral openings and attached to the frame operating shaft bearings for a slide carried by said cover plates and alined with bearings carried by the other side of the frame, and a bracket attached to and extending laterally from the latter side of said frame and provided with bearings in line with said frame bearings.

10. A machine frame for the purpose set forth comprising a base, an intermediate flanged frame member rising therefrom and formed between the flanges to provide ways for tool operating slides, plates applied and fixed rigidly to the opposite sides of said intermediate frame member, certain of the plates being removably fixed to the frame and constituting the sides of the ways at one side of the frame, laterally alined bearings carried by said removable plates and the opposite side of the frame, a bracket attached to and extending laterally from the latter side of the frame and formed with bearings alined with the frame bearings, and a foot rigid with and extending laterally from the base on the bracket side of the frame.

11. A machine for the purpose set forth comprising an intermediate member flanged to provide a tool operating slide, a guide or way which opens at one side of said member, an operating shaft bearing rigid with one side of the frame and extending into said way, and a cover plate applied over the open side of said way and removably fixed to the frame to constitute one side of said way and provided with an integral shaft bearing alined with said first bearing.

12. A machine for the purpose set forth comprising an intermediate member flanged to provide a tool operating slide, a guide or way which opens at one side of said member, a shaft bearing carried by said frame and extending into said way, and a cover plate applied over the open side of said way and formed with an inset shoulder to extend into and interlock with the walls of said way and removably fastened to the frame, said cover plate being formed with an integral shaft bearing in line with said first bearings.

13. A combined punch, section cutter, bar and plate shearing, and coping and notching machine frame comprising a base and an integral upstanding intermediate member flanged between and at its ends to provide ways for tool operating slides, which ways open at one side of said member, plates fixedly attached to said frame at its opposite sides, the plate at the open sides of said ways being interrupted at said ways, cover plates inset into said ways at said openings to interlock them with the frame members and removably attached thereto, said cover plates being provided with integral shaft bearings, and flanged bearings at the other side of the frame extending through one of said plates and the intermediate member to said ways and rigidly attached to the frame.

14. A combined punch, section cutter, bar and plate shearing, and coping and notching machine frame comprising a base, and an integral upstanding intermediate member flanged between and at its ends to provide ways for tool operating slides, which ways open at one side of said member, plates fixedly attached to said frame at its opposite sides, the plate at the open sides of said ways terminating at their edges at the inner sides of the ways at the ends of the frame and interrupted at the intermediate way, the end flanges of said intermediate member being flush with the latter plate, and cover plates applied over said ways fitted to the margins of said latter plates and to said end flanges and bolted to the frame.

15. In a machine for the purpose set forth, a frame embracing a filler member and side frame members that are fixed thereto and extend along the sides of the filler for a substantial distance and formed with integral extensions that overhang the frame to constitute a support for a coping and notching bolster.

16. In a machine for the purpose set forth, a frame embracing a filler member and side frame members fixed thereto and formed with integral extensions that are thickened in their overhanging portions abreast the filler member and meet to constitute an overhanging bolster for a coping and notching mechanism.

17. In combination with a frame for the purpose set forth comprising an intermediate cast metal member flanged to form a guide or way for a tool operating slide, and plates applied flatwise on and fixed to the opposite sides of said intermediate member, and extending therebeyond to form a support for a bolster of a coping and notching mechanism.

18. In combination with a frame for the purpose set forth comprising an intermediate cast metal member flanged to form a guide or way for a tool operating slide, plates applied flatwise on and rigidly attached to the opposite sides of the intermediate member, and extending beyond said intermediate member to form a support for a bolster of a coping and notching mechanism, said plates being provided with alined bearings for a slide operating shaft.

19. In combination with a frame for the purpose set forth comprising an intermediate cast metal member flanged to form a guide or way for a tool operating slide, plates applied flatwise on and fixed to the opposite sides of said intermediate member, integral extensions of said side plates projecting beyond the intermediate frame member and thickened to form an overhanging bolster for a coping and notching mechanism, and bearings carried by said plate for a slide operating shaft.

20. A machine frame comprising an intermediate flanged frame member to form tool slide ways, plates fixed to the opposite sides of said flanged member and provided with alined slide operating shaft bearings at said ways, a bracket extending from and attached to the one side of said frame, and bearings alined with the frame bearings carried by said bracket.

21. In a machine for the purpose set forth, a frame embracing a filler member and side frame members, which latter are formed with extensions that overhang the filler member to constitute a support for a coping and notching bolster, said side frame members extending above the coping and notching zone and being provided with a shaft bearing.

In testimony whereof I claim the foregoing as my invention, I hereunto append my signature at Chicago, Illinois, this 17th day of February, 1919.

HANS B. KRAUT.